United States Patent
Ding et al.

(10) Patent No.: US 10,574,637 B2
(45) Date of Patent: Feb. 25, 2020

(54) TERMINAL PAIRING METHOD AND PAIRING TERMINAL

(71) Applicant: Huawei Technologies Co., Ltd., Shenzhen (CN)

(72) Inventors: Zhiming Ding, Shenzhen (CN); Su Lu, Shenzhen (CN); Ping Fang, Shenzhen (CN); Xiaoxian Li, Shenzhen (CN); Ji Chen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/111,525

(22) PCT Filed: May 14, 2014

(86) PCT No.: PCT/CN2014/077444
§ 371 (c)(1),
(2) Date: Jul. 14, 2016

(87) PCT Pub. No.: WO2015/172329
PCT Pub. Date: Nov. 19, 2015

(65) Prior Publication Data
US 2016/0344712 A1    Nov. 24, 2016

(51) Int. Cl.
*H04L 29/06* (2006.01)
*H04W 76/14* (2018.01)
(Continued)

(52) U.S. Cl.
CPC ......... *H04L 63/061* (2013.01); *H04B 5/0031* (2013.01); *H04L 9/14* (2013.01);
(Continued)

(58) Field of Classification Search
CPC .................................................. H04L 63/061
(Continued)

(56) References Cited

U.S. PATENT DOCUMENTS 6,959,086 B2 * 10/2005 Ober .................... G06F 8/60
380/259
7,113,969 B1 * 9/2006 Green ............... G06F 7/49905
708/204

(Continued)

FOREIGN PATENT DOCUMENTS

| CN | 102255896 A | 11/2011 |
| CN | 102461128 A | 5/2012 |
| KR | 101314717 B1 | 10/2013 |

OTHER PUBLICATIONS

Foreign Communication From a Counterpart Application, Japanese Application No. 2016-568093, Japanese Office Action dated Jul. 11, 2017, 6 pages.

(Continued)

*Primary Examiner* — Peter C Shaw
(74) *Attorney, Agent, or Firm* — Conley Rose, P.C.

(57) ABSTRACT

A terminal pairing method and a pairing terminal includes acquiring, when a terminal detects a preset pairing trigger event, a pairing hidden value that is of the terminal and that is associated with the preset pairing trigger event; and implementing, by the terminal, pairing with the peer end by using the pairing hidden value of the terminal. Compared with some approaches, in the present disclosure, pairing can be accurately implemented without using an NFC interface, which reduces costs of terminal pairing.

10 Claims, 9 Drawing Sheets

(51) Int. Cl.
  *H04W 4/21*   (2018.01)
  *H04W 4/80*   (2018.01)
  *H04B 5/00*   (2006.01)
  *H04L 9/14*   (2006.01)
  *H04L 9/30*   (2006.01)
  *H04W 12/06*  (2009.01)

(52) U.S. Cl.
  CPC .............. *H04L 9/30* (2013.01); *H04L 63/083* (2013.01); *H04W 4/21* (2018.02); *H04W 4/80* (2018.02); *H04W 12/06* (2013.01); *H04W 76/14* (2018.02)

(58) Field of Classification Search
  USPC ........................................................ 713/171
  See application file for complete search history.

(56) References Cited

U.S. PATENT DOCUMENTS

| | | | |
|---|---|---|---|
| 2007/0188323 A1* | 8/2007 | Sinclair | G06F 21/445 340/568.1 |
| 2009/0031258 A1* | 1/2009 | Arrasvuori | G06F 3/017 715/863 |
| 2010/0050116 A1* | 2/2010 | Blick | G06F 19/366 715/808 |
| 2010/0278345 A1* | 11/2010 | Alsina | H04L 63/0492 380/283 |
| 2011/0053558 A1* | 3/2011 | Teague | H04L 9/3273 455/411 |
| 2011/0126009 A1 | 5/2011 | Camp et al. | |
| 2011/0126014 A1* | 5/2011 | Camp, Jr. | H04M 1/7253 713/171 |
| 2011/0159857 A1* | 6/2011 | Faith | G06Q 30/0201 455/414.3 |
| 2011/0314153 A1 | 12/2011 | Bathiche et al. | |
| 2012/0128154 A1* | 5/2012 | Ran | H04K 1/00 380/255 |
| 2012/0317409 A1 | 12/2012 | Revel et al. | |
| 2014/0082185 A1* | 3/2014 | Abraham | H04W 24/00 709/224 |
| 2014/0141826 A1* | 5/2014 | Cordeiro | H04W 48/14 455/509 |
| 2014/0254426 A1* | 9/2014 | Abraham | H04W 48/10 370/254 |
| 2015/0028996 A1* | 1/2015 | Agrafioti | G06F 21/40 340/5.82 |
| 2015/0227589 A1* | 8/2015 | Chakrabarti | G06F 17/30525 707/748 |
| 2016/0353500 A1* | 12/2016 | Choi | H04L 5/0053 |

OTHER PUBLICATIONS

Foreign Communication From a Counterpart Application, Japanese Application No. 2016-568093, English Translation of Japanese Office Action dated Jul. 11, 2017, 7 pages.
"Part 11: Wireless LAN Medium Access Control (MAC) and Physical Layer (PHY) Specifications," IEEE Std 802.11, Mar. 29, 2012, 2793 pages.
Foreign Communication From a Counterpart Application, European Application No. 14892077.0, Extended European Search Report dated Oct. 24, 2016, 7 pages.
Foreign Communication From a Counterpart Application, PCT Application No. PCT/CN2014/077444, English Translation of International Search Report dated Feb. 17, 2015, 2 pages.
Foreign Communication From a Counterpart Application, PCT Application No. PCT/CN2014/077444, English Translation of Written Opinion dated Feb. 17, 2015, 8 pages.
Foreign Communication From a Counterpart Application, Chinese Application No. 201480004670.9, Chinese Office Action dated May 31, 2017, 6 pages.

* cited by examiner

TERMINAL PAIRING METHOD AND PAIRING TERMINAL

CROSS-REFERENCE TO RELATED APPLICATIONS

This application is a national stage application of international patent application number PCT/CN2014/077444 filed on May 14, 2014, which is incorporated by reference.

TECHNICAL FIELD

The present disclosure relates to the field of communications technologies, and specifically, to a terminal pairing method and a pairing terminal.

BACKGROUND

With development of network technologies, people are accustomed to mutually sharing data information. Generally, people share data or media content with another terminal in a manner of a multimedia message, an email, or chat software such as QQ and WeChat. Currently, face-to-face users can also complete content sharing by means of an operation between terminals, such as simple touching or shaking. However, before content sharing, how to implement pairing of terminals that are to share content is a relatively tough problem currently.

Currently, there is a terminal pairing method in which hidden data is exchanged by using a near-field communication (NFC) interface. Because a communication distance of the NFC interface is short, it is difficult for a third party to perform interception, and it is more difficult to perform a man-in-the-middle attack, terminal pairing can be completed by using the NFC interface. However, because costs of the NFC interface are relatively high, the solution is not easy to be popularized in various types of terminals.

SUMMARY

The present disclosure provides a terminal pairing method and a pairing terminal, where terminal pairing can be accurately implemented in a condition in which an NFC interface is not used.

To resolve the foregoing technical problem, technical solutions adopted in the present disclosure are:

According to a first aspect, the present disclosure provides a terminal pairing method, where the method includes acquiring, when a terminal detects a preset pairing trigger event, a pairing hidden value that is of the terminal and that is associated with the pairing trigger event; and implementing, by the terminal, pairing with a peer end by using the pairing hidden value of the terminal.

In a first possible implementation manner of the first aspect, the acquiring, when a terminal detects a preset pairing trigger event, a pairing hidden value that is of the terminal and that is associated with the pairing trigger event includes acquiring, by the terminal when the terminal detects the preset pairing trigger event, a time length of the terminal that is relative to occurrence time of the event and that is obtained based on a common reference time point with the peer end; and/or, acquiring, by the terminal, a motion direction value of the terminal when the terminal detects the preset pairing trigger event.

With reference to the first possible implementation manner of the first aspect, in a second possible implementation manner, the acquiring, by the terminal when the terminal detects the preset pairing trigger event, a time length of the terminal that is relative to occurrence time of the event and that is obtained based on a common reference time point with the peer end includes: when the terminal detects the preset pairing trigger event, acquiring the occurrence time of the pairing trigger event as a first time point of the terminal; acquiring, by the terminal according to any message exchanged with the peer end, a second time point that is of the terminal and that is based on the message with the peer end; and acquiring, by the terminal, the time length of the terminal, where the time length of the terminal is a time interval between the first time point of the terminal and the second time point of the terminal.

With reference to the second possible implementation manner of the first aspect, in a third possible implementation manner, after the acquiring the occurrence time of the pairing trigger event as a first time point of the terminal, and before the acquiring, by the terminal according to any message exchanged with the peer end, a second time point that is of the terminal and that is based on the message with the peer end, the method further includes randomly delaying, by the terminal, time r after the pairing trigger event is detected, and sending a discovery request message to the peer end by using a wireless interface.

With reference to the third possible implementation manner of the first aspect, in a fourth possible implementation manner, after the randomly delaying, by the terminal, time r after the pairing trigger event is detected, and sending a discovery request message to the peer end by using a wireless interface, the method further includes receiving, by the terminal, a discovery response message from the peer end, where the discovery response message is sent after time R is delayed after the peer end receives the discovery request message, and R is greater than r.

With reference to the second possible implementation manner of the first aspect, in a fifth possible implementation manner, the acquiring, by the terminal according to any message exchanged with the peer end, a second time point that is of the terminal and that is based on the message with the peer end is acquiring, by the terminal according to any message exchanged with the peer end on a preset channel, the second time point that is of the terminal and that is based on the message with the peer end.

With reference to the second possible implementation manner of the first aspect, in a sixth possible implementation manner, after the acquiring, by the terminal, the time length of the terminal, where the time length of the terminal is a time interval between the first time point of the terminal and the second time point of the terminal, the method further includes normalizing, by the terminal, the time length of the terminal by using a preset normalization method.

In a seventh possible implementation manner of the first aspect, the implementing, by the terminal, pairing with a peer end by using the pairing hidden value of the terminal includes acquiring, by the terminal, a public key of the peer end by using the pairing hidden value of the terminal and information from the peer end, where the information from the peer end includes a pairing hidden value of the peer end; generating, by the terminal, a shared key of the terminal by using the public key of the peer end and a private key of the terminal; and implementing, by the terminal, pairing with the peer end by verifying the shared key of the terminal and a shared key of the peer end.

With reference to the seventh possible implementation manner of the first aspect, in an eighth possible implementation manner, the method further includes sending, by the terminal, the pairing hidden value of the terminal to the peer end, so that the peer end implements pairing with the terminal.

With reference to the seventh possible implementation manner of the first aspect, in a ninth possible implementation manner, the acquiring, by the terminal, a public key of the peer end by using the pairing hidden value of the terminal and information from the peer end, where the information from the peer end includes a pairing hidden value of the peer end includes receiving, by the terminal, a first secret value and any random number that are sent by the peer end, where the first secret value is obtained by encrypting the public key and the random number that are of the peer end by using the pairing hidden value of the peer end; and decrypting, by the terminal by using the pairing hidden value of the terminal and the random number of the peer end, the first secret value to obtain the public key of the peer end.

With reference to the seventh possible implementation manner of the first aspect, in a tenth possible implementation manner, the acquiring, by the terminal, a public key of the peer end by using the pairing hidden value of the terminal and information from the peer end, where the information from the peer end includes a pairing hidden value of the peer end includes receiving, by the terminal, a first secret value and a first operation value that are sent by the peer end, where the first secret value includes a value obtained by encrypting the public key of the peer end by using the pairing hidden value of the peer end, and the first operation value includes a value obtained by using the pairing hidden value of the terminal and the pairing hidden value of the peer end by means of a preset budget method; obtaining, by the terminal, the pairing hidden value of the peer end by using the first operation value from the peer end and the pairing hidden value of the terminal; and decrypting, by the terminal by using the pairing hidden value of the peer end, the first secret value from the peer end to obtain the public key of the peer end.

In an eleventh possible implementation manner of the first aspect, the implementing, by the terminal, pairing with a peer end by using the pairing hidden value of the terminal includes: obtaining, by the terminal, a pairing hidden value of the peer end by using information from the peer end and information of the terminal, where the information from the peer end includes a public key and the pairing hidden value that are of the peer end, and the information of the terminal includes a private key of the terminal; and implementing, by the terminal, pairing with the peer end by comparing the pairing hidden value of the terminal and the pairing hidden value of the peer end.

With reference to the eleventh possible implementation manner of the first aspect, in a twelfth possible implementation manner, the obtaining, by the terminal, a pairing hidden value of the peer end by using information from the peer end and information of the terminal, where the information from the peer end includes a public key and the pairing hidden value that are of the peer end, and the information of the terminal includes a private key of the terminal includes receiving, by the terminal, a first message from the peer end, where the first message from the peer end includes the public key and a second secret value that are of the peer end, and the second secret value of the peer end includes a value obtained by encrypting the pairing hidden value of the peer end by using a preset key of the peer end; generating, by the terminal, a shared key of the terminal by using the private key of the terminal and the public key of the peer end; receiving, by the terminal, a second message from the peer end, where the second message from the peer end includes a third secret value of the peer end, and the third secret value of the peer end includes a value obtained by encrypting the preset key of the peer end by using a shared key of the peer end; and decrypting, by the terminal by using the shared key of the terminal, the third secret value of the peer end to obtain the preset key of the peer end, and decrypting, by using the preset key of the peer end, the second secret value of the peer end to obtain the pairing hidden value of the peer end.

With reference to the twelfth possible implementation manner of the first aspect, in a thirteenth possible implementation manner, the first message from the peer end further includes a first message integrity code of the peer end, where the first message integrity code of the peer end includes a value obtained by the peer end by encrypting summary information of the first message from the peer end by using the pairing hidden value of the peer end; and after the terminal obtains the pairing hidden value of the peer end by decrypting the second secret value of the peer end by using the preset key of the peer end, the method further includes verifying, by the terminal, the first message integrity code of the peer end by using the pairing hidden value of the peer end.

With reference to the thirteenth possible implementation manner of the first aspect, in a fourteenth possible implementation manner, the implementing, by the terminal, pairing with the peer end by comparing the pairing hidden value of the terminal and the pairing hidden value of the peer end includes determining, by the terminal, whether a difference between the pairing hidden value of the terminal and the pairing hidden value of the peer end is within a preset allowable error range; and implementing, by the terminal, pairing with the peer end when the difference is within the preset allowable error range and the first message integrity code of the peer end passes verification.

With reference to the twelfth possible implementation manner of the first aspect, in a fifteenth possible implementation manner, the second message from the peer end further includes a second message integrity code of the peer end, and the second message integrity code of the peer end includes a value obtained by the peer end by encrypting summary information of the second message from the peer end by using the shared key of the peer end; and after the receiving, by the terminal, a second message from the peer end, the method further includes verifying, by the terminal, the second message integrity code of the peer end by using the shared key of the terminal.

According to a second aspect, the present disclosure provides a pairing terminal, where the terminal includes a detecting unit, an acquiring unit, and a pairing unit, where the detecting unit is configured to detect an event that triggers pairing with a peer end; the acquiring unit is configured to, when the detecting unit detects the event that triggers pairing with the peer end, acquire a pairing hidden value that is of the terminal and that is associated with the event that triggers pairing with the peer end; and the pairing unit is configured to implement pairing with the peer end by using the pairing hidden value of the terminal.

In a first possible implementation manner of the second aspect, the acquiring unit includes: a first acquiring subunit configured to, when the detecting unit detects the event that triggers pairing with the peer end, acquire a time length of the terminal that is relative to occurrence time of the event and that is obtained based on a common reference time point with the peer end; and/or, a second acquiring subunit configured to acquire a motion direction value of the terminal when the detecting unit detects the event that triggers pairing with the peer end.

With reference to the first possible implementation manner of the second aspect, in a second possible implementation manner, the first acquiring subunit includes: a third acquiring subunit configured to, when the detecting unit detects the event that triggers pairing with the peer end, acquire the occurrence time of the event that triggers pairing with the peer end as a first time point of the terminal; a fourth acquiring subunit configured to acquire, according to any message exchanged with the peer end, a second time point that is of the terminal and that is based on the message with the peer end; and a fifth acquiring subunit configured to acquire the time length of the terminal, where the time length of the terminal is a time interval between the first time point of the terminal and the second time point of the terminal.

With reference to the second possible implementation manner of the second aspect, in a third possible implementation manner, the first acquiring subunit further includes a first sending subunit configured to randomly delay time r after the event that triggers pairing with the peer end is detected, and send a discovery request message to the peer end by using a wireless interface.

With reference to the third possible implementation manner of the second aspect, in a fourth possible implementation manner, the first acquiring subunit further includes a first receiving subunit configured to receive a discovery response message from the peer end, where the discovery response message is sent after time R is delayed after the peer end receives the discovery request message, and R is greater than r.

With reference to the second possible implementation manner of the second aspect, in a fifth possible implementation manner, the fourth acquiring subunit is specifically a unit that acquires, according to any message exchanged with the peer end on a preset channel, the second time point that is of the terminal and that is based on the message with the peer end.

With reference to the second possible implementation manner of the second aspect, in a sixth possible implementation manner, the terminal further includes a normalizing subunit configured to normalize the time length of the terminal by using a preset normalization method.

In a seventh possible implementation manner of the second aspect, the pairing unit includes a sixth acquiring subunit configured to acquire a public key of the peer end by using the pairing hidden value of the terminal and information from the peer end, where the information from the peer end includes a pairing hidden value of the peer end; a first generating subunit configured to generate a shared key of the terminal by using the public key of the peer end and a private key of the terminal; and a first pairing subunit configured to implement pairing with the peer end by verifying the shared key of the terminal and a shared key of the peer end.

With reference to the seventh possible implementation manner of the second aspect, in an eighth possible implementation manner, the terminal further includes a sending unit, where the sending unit is configured to send the pairing hidden value of the terminal to the peer end, so that the peer end implements pairing with the terminal.

With reference to the seventh possible implementation manner of the second aspect, in a ninth possible implementation manner, the sixth acquiring subunit includes a second receiving subunit configured to receive a first secret value and any random number that are sent by the peer end, where the first secret value is obtained by encrypting the public key and the random number that are of the peer end by using the pairing hidden value of the peer end; and a first decrypting subunit configured to decrypt, by using the pairing hidden value of the terminal and the random number of the peer end, the first secret value to obtain the public key of the peer end.

With reference to the seventh possible implementation manner of the second aspect, in a tenth possible implementation manner, the sixth acquiring subunit includes a third receiving subunit configured to receive a first secret value and a first operation value that are sent by the peer end, where the first secret value includes a value obtained by encrypting the public key of the peer end by using the pairing hidden value of the peer end, and the first operation value includes a value obtained by using the pairing hidden value of the terminal and the pairing hidden value of the peer end by means of a preset budget method; a second generating subunit configured to obtain the pairing hidden value of the peer end by using the first operation value from the peer end and the pairing hidden value of the terminal; and a second decrypting subunit configured to decrypt, by using the pairing hidden value of the peer end, the first secret value from the peer end to obtain the public key of the peer end.

In an eleventh possible implementation manner of the second aspect, the pairing unit includes a third generating subunit configured to obtain a pairing hidden value of the peer end by using information from the peer end and information of the terminal, where the information from the peer end includes a public key and the pairing hidden value that are of the peer end, and the information of the terminal includes a private key of the terminal; and a second pairing subunit configured to implement pairing with the peer end by comparing the pairing hidden value of the terminal and the pairing hidden value of the peer end.

With reference to the eleventh possible implementation manner of the second aspect, in a twelfth possible implementation manner, the third generating subunit includes a fourth receiving subunit configured to receive a first message from the peer end, where the first message from the peer end includes the public key and a second secret value that are of the peer end, and the second secret value of the peer end includes a value obtained by encrypting the pairing hidden value of the peer end by using a preset key of the peer end; a fourth generating subunit configured to generate a shared key of the terminal by using the private key of the terminal and the public key of the peer end; a fifth receiving subunit configured to receive a second message from the peer end, where the second message from the peer end includes a third secret value of the peer end, and the third secret value of the peer end includes a value obtained by encrypting the preset key of the peer end by using a shared key of the peer end; and a third decrypting subunit configured to decrypt, by using the shared key of the terminal, the third secret value of the peer end to obtain the preset key of the peer end, and decrypt, by using the preset key of the peer end, the second secret value of the peer end to obtain the pairing hidden value of the peer end.

With reference to the twelfth possible implementation manner of the second aspect, in a thirteenth possible implementation manner, the first message from the peer end further includes a first message integrity code of the peer end, where the first message integrity code of the peer end includes a value obtained by the peer end by encrypting summary information of the first message from the peer end by using the pairing hidden value of the peer end; and the third generating subunit further includes a first verifying subunit, where the first verifying subunit is configured to verify the first message integrity code of the peer end by using the pairing hidden value of the peer end.

With reference to the thirteenth possible implementation manner of the second aspect, in a fourteenth possible implementation manner, the second pairing subunit includes a determining subunit configured to determine whether a difference between the pairing hidden value of the terminal and the pairing hidden value of the peer end is within a preset allowable error range; and a third pairing subunit configured to implement pairing with the peer end when the difference is within the preset allowable error range and the first message integrity code of the peer end passes verification.

With reference to the twelfth possible implementation manner of the second aspect, in a fifteenth possible implementation manner, the second message from the peer end further includes a second message integrity code of the peer end, where the second message integrity code of the peer end includes a value obtained by the peer end by encrypting summary information of the second message from the peer end by using the shared key of the peer end; and the third generating subunit further includes a second verifying subunit, where the second verifying subunit is configured to verify the second message integrity code of the peer end by using the shared key of the terminal.

In the present disclosure, when a terminal detects a pairing trigger event that triggers pairing with a peer end, the terminal first acquires a pairing hidden value that is of the terminal and that is associated with the pairing trigger event, and then implements a pairing process with the peer end by using the pairing hidden value of the terminal. Compared with some approaches, in the present disclosure, pairing can be accurately implemented without using an NFC interface, which reduces costs of the terminal.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and persons of ordinary skill in the art may still derive other drawings from these accompanying drawings without creative efforts.

DESCRIPTION OF EMBODIMENTS

In order to enable persons skilled in the art to better understand the solutions in the embodiments of the present disclosure, the following describes the embodiments of the present disclosure in more detail with reference to accompanying drawings and implementation manners.

Embodiment 1

Figure 1:
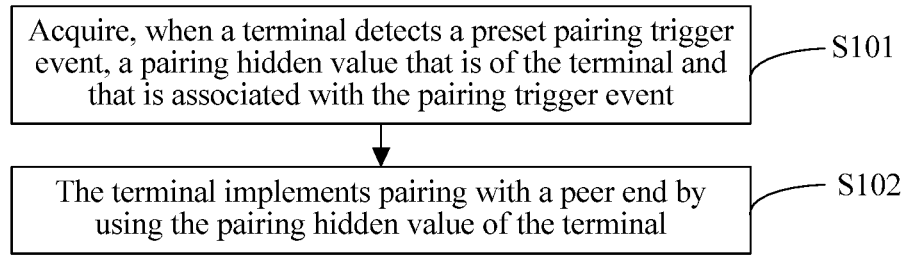
FIG. 1 is a flowchart of a terminal pairing method according to an embodiment of the present disclosure.

Referring to FIG. 1, FIG. 1 is a flowchart of a terminal pairing method provided in this embodiment, where the method includes:

S101: Acquire, when a terminal detects a preset pairing trigger event, a pairing hidden value that is of the terminal and that is associated with the pairing trigger event.

S102: The terminal implements pairing with a peer end by using the pairing hidden value of the terminal.

In this embodiment, it is assumed that terminals that need to implement pairing are respectively a first terminal and a second terminal. First, a pairing trigger event is separately set on the first terminal and the second terminal. For example, that the first terminal and the second terminal touch or the like is set as the pairing trigger event. When the first terminal and the second terminal touch, the first terminal and the second terminal respectively record pairing hidden values that are of the terminals and that are associated with the pairing trigger event. The pairing hidden values of the terminals may be time lengths of the terminals that are relative to occurrence time of the pairing trigger event and that are respectively obtained by the first terminal and the second terminal based on a common reference point, or may be motion direction values of the first terminal and the second terminal when the pairing trigger event occurs.

Specifically, when the preset pairing trigger event occurs, the first terminal and the second terminal may respectively record the motion direction values of the terminals, for example, may periodically read, by using a central processing unit (CPU), sensing data of a sensing apparatus such as a tri-axis accelerometer, a gravity sensor, or an electronic compass. When it is detected that the terminal rapidly moves in one direction, and then a motion speed in the direction plummets to 0 or reverse motion is suddenly performed, it is determined that a touch event occurs. In this case, a motion direction may be analyzed according to series of previously read sensor data. For example, the first terminal detects that a motion direction is five degrees east by north and three degrees nosing up, a motion direction of the second terminal is five degrees west by south and three degrees nosing down, and then the motion directions of the two terminals are opposite. In actual determining, some errors are allowed for angles of the motion directions.

The following describes specific content about that the terminal acquires a time length that is based on an occurrence time point of the pairing trigger event.

First, an occurrence time point of the touch event is acquired.

In an actual application, an accelerometer may be used to determine the occurrence time point of the touch event. A usual practice is that the CPU periodically reads an acceleration value of the accelerometer. If the acceleration value acutely changes and an obvious inflection point occurs, for example, the terminal relatively rapidly moves towards one direction and then suddenly stops, in this case, it indicates that the touch event occurs in the terminal. After determining the touch event according to a change of the acceleration value, the terminal in this embodiment immediately records system time when the touch event occurs, for example, CPU system time, which is accurate to a microsecond. A time error generated in the occurrence time point of the touch event that is detected by the two devices by using a sensor such as the accelerometer may be from 1 to 20 milliseconds.

Figure 2:
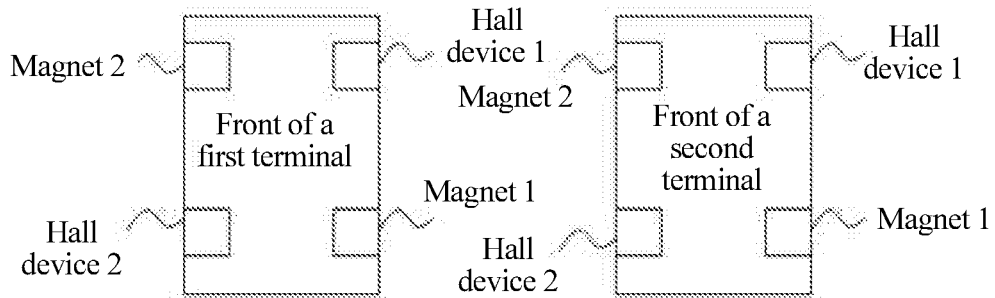
FIG. 2 is a schematic structural diagram of a first terminal and a second terminal on which two Hall devices and two magnets are installed according to an embodiment of the present disclosure.

In addition, in this embodiment, the occurrence time point of the touch event may be detected in a Hall induction manner. Specifically, at least one Hall device and one magnet need to be installed on each terminal, where the magnet may be an electromagnet. For ease of use, two Hall devices and two magnets may also be installed on each terminal. As shown in FIG. 2, FIG. 2 is a schematic structural diagram of a first terminal and a second terminal on which two Hall devices and two magnets are installed. When the first terminal and the second terminal touch, a Hall device 1 of the first device detects that a magnet 2 of the second terminal approaches, and sends, to a CPU of the first terminal, a signal indicating that the touch event occurs. At the same time, a Hall device 2 of the second terminal detects that a magnet 1 of the first terminal approaches, and sends, to a CPU of the second terminal, a signal indicating that the touch event occurs. When the first terminal and the second terminal touch properly, the Hall devices of the two devices detect touch events at the same time, and an error of occurrence time points of the two touch events may be as small as several milliseconds or less.

Besides the foregoing two methods for detecting the touch event, another technique may be used to detect the touch event in this embodiment. The present disclosure sets no limitation on a technical implementation method for detecting the touch event. As long as two mutually touching terminals can detect the occurrence time point of the touch event at the same time with an extremely small time error, the solution in the present disclosure is applicable. The extremely small time error may be denoted as D in this embodiment, where D may be in a unit of a microsecond, and a smaller value of D is better, for example, 100 microseconds.

Then, a time length is acquired according to a common reference point.

The common reference point is a time point that is obtained by the two terminals from a message exchanged by using a first wireless communications interface, and time from the occurrence time point of the touch point to the common reference point is the time length. The first wireless communications interface may be enabled before the pairing trigger event occurs. For example, when a program used for content sharing starts to run, the first wireless communications interface is enabled and waits for occurrence of the pairing trigger event. The first wireless communications interface may be enabled after the pairing trigger event occurs, that is, the first wireless communications interface is enabled after the pairing trigger event is detected. The first wireless communications interface may be a wireless communications technology, such as wireless fidelity (WiFi) or Bluetooth. The first wireless communications interface may be the same as or different from a second wireless interface that transmits shared content after pairing succeeds. For example, both the first wireless communications interface and a second wireless communications interface are WiFi interfaces. Alternatively, a Bluetooth low energy (BLE) interface is enabled before the pairing trigger event occurs, a pairing process is completed by using the BLE interface, and then a WiFi interface is enabled to complete content transmission. In this way, power consumption of the terminals may be reduced.

Figure 3:
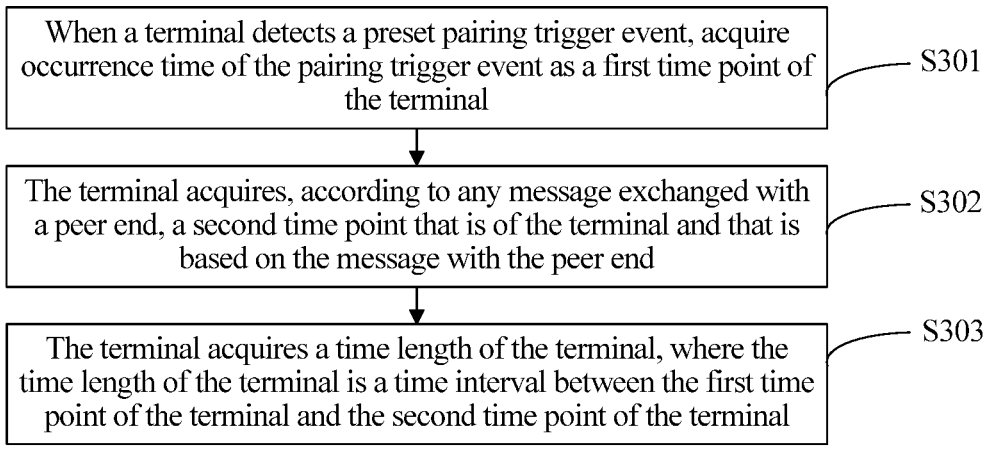
FIG. 3 is a flowchart of a method for implementing that a terminal acquires a time length that is based on occurrence time of a preset pairing trigger event according to an embodiment of the present disclosure.

Referring to FIG. 3, FIG. 3 is a flowchart of a method for implementing that a terminal acquires a time length that is based on occurrence time of a preset event that triggers pairing with a peer end according to this embodiment, where the method may include:

S301: When the terminal detects the pairing trigger event, acquire the occurrence time of the pairing trigger event as a first time point of the terminal.

S302: The terminal acquires, according to any message exchanged with the peer end, a second time point that is of the terminal and that is based on the message with the peer end.

S303: The terminal acquires a time length of the terminal, where the time length of the terminal is a time interval between the first time point of the terminal and the second time point of the terminal.

In an actual application, first, two terminals that need to be paired trigger a preset pairing trigger event. For example, the two terminals touch. In this case, the two terminals separately record an occurrence time point of the pairing trigger event and determine the occurrence time point as a first time point of the terminal. Then, the two terminals separately record, by using any message exchanged between the two terminals, a second time point that is of the terminal and that is based on the message. Because the message is transmitted at a speed of light, and a distance between the two terminals is extremely short, it may as well be assumed that the two devices are one meter away from each other after touching, and time required by a signal to reach the other terminal from one terminal is only 3.3 nanoseconds, which may be ignored. Therefore, in this embodiment, a sending terminal of the message records system time as a second time point when sending the message, and a receiving terminal of the message records system time as a second time point when receiving the message. It can be considered that the second time points respectively recorded by the two terminals are the same or extremely close. Finally, because both the first time point and the second time point separately recorded by the two terminals in which the pairing trigger event occurs are theoretically the same, the two terminals respectively acquire their respective time lengths in this embodiment, where the time lengths are time intervals between their respective first time points and second time points. It can be understood that the time lengths of the two terminals in which the pairing trigger event occurs should also be theoretically the same.

Figure 4:
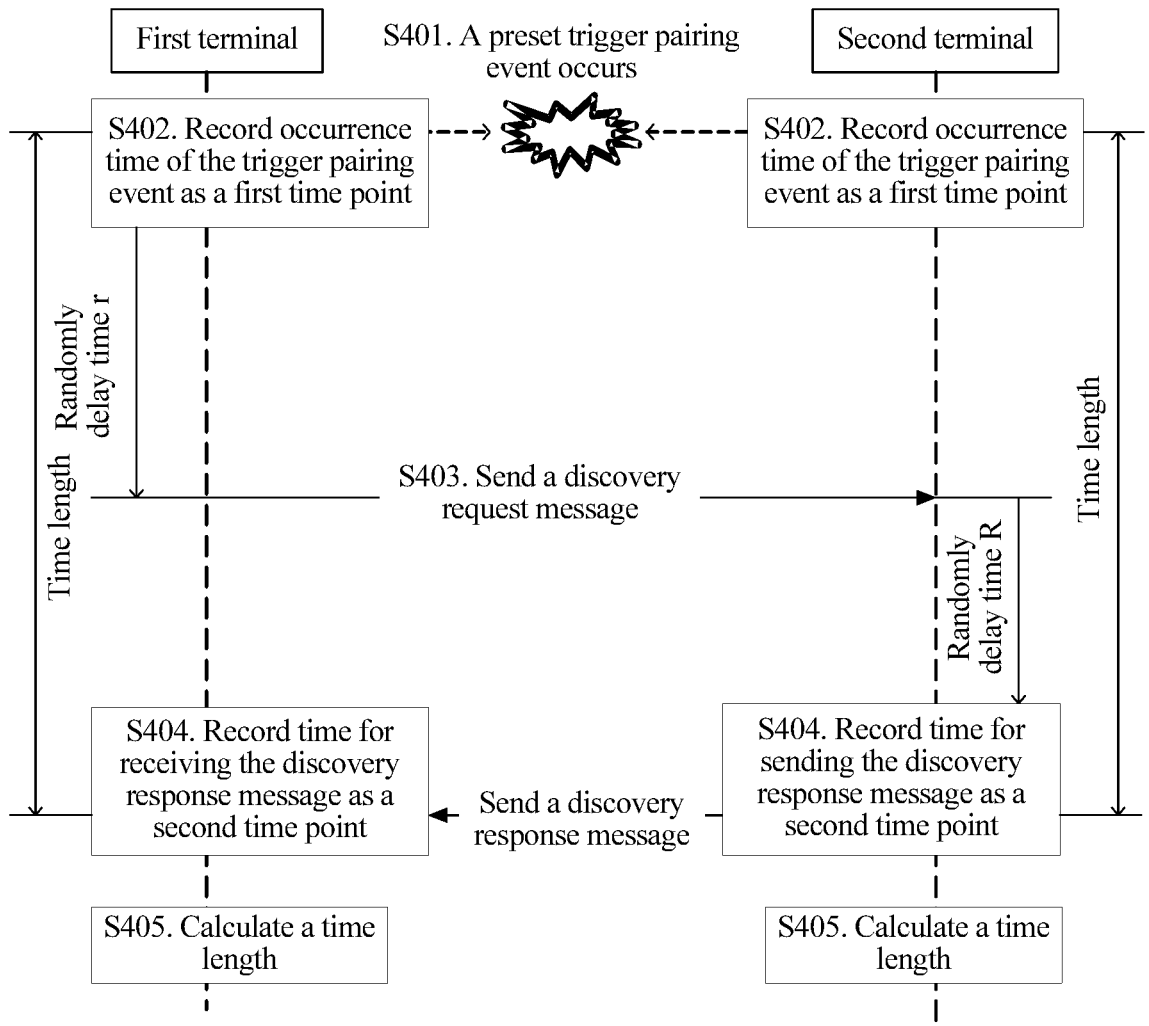
FIG. 4 is an interaction diagram of a method for implementing that a terminal acquires a time length that is based on occurrence time of a preset pairing trigger event according to an embodiment of the present disclosure.

The following describes a specific implementation manner of the foregoing method for acquiring the time length. Referring to FIG. 4, FIG. 4 is an interaction diagram of a method for implementing that a terminal acquires a time length that is based on occurrence time of a preset pairing trigger event. Terminals implementing pairing are respectively a first terminal and a second terminal, and the method includes:

S401: A pairing trigger event, for example, a touch event, occurs in the first terminal and the second terminal.

S402: When the pairing trigger event occurs, the first terminal and the second terminal separately determine system time when the pairing trigger event occurs as a first time point.

S403: After randomly delaying time r, the first terminal sends a first message by using a wireless interface, such as a WiFi or Bluetooth interface, where the first message is generally a discovery request message. Specifically, the discovery request message may be a probe request frame defined in Institute of Electrical and Electronics Engineers (IEEE) 802.11.

That the first terminal sends the first message after randomly delaying the time r aims to prevent an attacker from speculating an occurrence time point of the touch event in a manner of intercepting the first message, and implementing pairing with the first terminal as a counterfeit second terminal.

To ensure a sending success rate of the first message, the first terminal may rapidly send the first message three times in succession, and had better ensure that a time point of sending the first message for the last time needs to be completed before a preset time point.

In addition, to accelerate a terminal pairing process, the first terminal may be set to send the discovery request message only on a preset specific wireless channel, and the second terminal intercepts the discovery request message only on the specific wireless channel. It is worth noting that because the first terminal generally does not know an address of the second terminal, the discovery request message is generally broadcast.

S404: After receiving the discovery request message, the second terminal delays time R to send, to the first terminal, a response message for the discovery request message, that is, a discovery response message. In addition, the second terminal records system time as a second time point when sending the discovery response message, and the first terminal records system time as a second time point when receiving the discovery response message.

More specifically, the second terminal records the system time as the second time point when starting to send the discovery response message, and the first terminal records the system time as the second time point when starting to receive the discovery response message. Certainly, the first terminal may record a third time point when determining that the discovery response message is received, and determine the second time point of the first terminal by subtracting time required for receiving the discovery response message. In this way, the system time recorded by the two terminals is a transmission time point of a same message starting end. An error of the system time recorded by the two terminals is time during which the message starting end is transmitted in the air plus a possible delay generated by circuit processing, and the error may be extremely small. Actually, the second time point may be obtained by using another method. For example, the two devices both record a transmission time point of a terminating end of the discovery response message, that is, a time point at which the second device completes sending of the discovery response message and a time point at which the first device completes receiving of the discovery response message. The second time point may be obtained according to a subsequent message of the discovery request message or the discovery response message.

R is a preset fixed time value, and r may be set to be less than or equal to R.

In an actual application, a response message for the first message is generally the discovery response message. Specifically, the discovery response message may be a probe response frame defined in the IEEE 802.11.

That the second terminal sends the discovery response message after delaying the time R aims to prevent the attacker from triggering, by continuously sending the discovery request message, the second terminal to immediately send the discovery response message after the pairing trigger event occurs, so that the attacker easily speculates an occurrence time point of the pairing trigger event and implements pairing with the second terminal as a counterfeit first terminal.

In addition, there still may be another interaction process for completing a terminal discovery process in this embodiment. For example, according to IEEE 802.11 specifications, after the probe processes S403 and S404, that is, Probe Request and Probe Response processes, there still may be an IEEE 802.11 authentication process and association process, which is not described in detail herein any further.

S405: The first terminal and the second terminal separately calculate a time length, where the time length is a time interval between a first time point and a second time point that are of the first terminal and the second terminal each.

In this embodiment, the time length is a time length that is relative to the occurrence time point of the touch event and that is based on a common reference point for the first terminal and the second terminal. The common reference point in this embodiment is implemented by using a message, for example, the discovery request message or the discovery response message.

In an actual implementation process in this embodiment, that the terminal records a time point at which a wireless interface frame is sent or received needs to be implemented in a wireless interface chip. Because if the system time is read when a CPU learns that the wireless interface chip sends or receives a wireless interface frame, a relatively large error is generated. However, a program in the wireless interface chip, for example, a WiFi chip, generally cannot read system time of the CPU, and a program running on the CPU may read timestamp information in the WiFi chip. Therefore, some techniques are required when a related first time point and second time point are acquired.

Specifically, in actual implementation, if each terminal already enables a wireless interface, for example, a WiFi interface, before the pairing trigger event occurs, the terminal directly reads a timestamp in the WiFi chip as the first time point when detecting the pairing trigger event, may directly acquire, by using the program in the WiFi chip, the timestamp information of the WiFi chip as the second time point when sending or receiving a WiFi frame, and then transmit the obtained second time point to the program in the CPU.

In actual implementation, if each terminal does not enable the wireless interface, for example, the WiFi interface, before the pairing trigger event occurs, but enables WiFi before the first message is sent, in this case, for a first time point of each terminal, system time Ta1 of the CPU at that time may be acquired as the first time point by using the program running on the CPU; in addition, the program running on the CPU acquires system time Ta2 of the CPU and timestamp information timing synchronization function a1 (TSFa1) of the WiFi chip when enabling of the WiFi interface is completed. Time after the WiFi chip is started is counted in a unit of a microsecond. Afterward, a second time point of each terminal may be obtained by acquiring timestamp information TSFa2 of the WiFi chip by using the program running on the WiFi chip. It can be understood that the time length determined in the foregoing implementation manner may be obtained by using the following formula: Time length=TSFa2−TSFa1+Ta2−Ta1.

In an actual application, the first terminal and the second terminal may use a communications technology, for example, BLE, to complete a device discovery process after the pairing trigger event and complete acquiring of the time length. For a subsequent authentication process implemented by using the time length or data transmission of shared content, another communications technology, for example, WiFi, may be used.

Because an error exists, time lengths respectively obtained by the first terminal and the second terminal are hardly equal actually. The error is mainly from a possible difference in time when the two terminals detect the pairing trigger event after the pairing trigger event occurs, and an error may further be generated in a subsequent process in which the time length based on the common reference time point is obtained. Therefore, to facilitate a subsequent pairing matching process that is described in the present disclosure and that is performed by using the time length as hidden data, the error between the time lengths obtained by the first terminal and the second terminal needs to be eliminated to the full extent, so that values of the time lengths of the two devices are equal or relatively close for easy calculation. For example, in a case in which the two terminals detect that a difference of 1000 microseconds is allowed for the occurrence time of the pairing trigger event, to make a value of the time length within a proper error range be further closer, a preset normalization method is used in the present disclosure to normalize the time length, that is, the time length is converted into a value with a larger time unit. Specifically, the time length may be converted into a value with 200 microseconds as a unit.

Specifically, due to a value of a mantissa, no determined calculation method implements that a same value is certainly obtained after two raw values within an allowable error range are separately calculated by using the foregoing conversion method, and different values are certainly obtained after raw values that are not within the allowable error range are separately calculated by using the conversion method. There are always some cases in which two raw values are definitely within the allowable error range, but values of the two raw values are not equal after an error is eliminated, and/or in other cases, an error of two raw values exceeds the allowable error range, but a same value is obtained after an error is eliminated, which is referred to as incorrect determining by an allowable error. A value interval of the incorrect determining is referred to as an interval of incorrect determining by the allowable error, which is called an interval of incorrect determining for short. Therefore, when the allowable error is 1000 microseconds, if the obtained time length is converted into a value with 1000 microseconds as a unit, a possibility of incorrect determining is relatively high. When the obtained time length is converted into a value with 200 microseconds as a unit, the possibility of incorrect determining is relatively low. Certainly, if the allowable error is extremely small, for example, only one microsecond (the obtained time length is also in a unit of a microsecond), normalization is completely not required, and there is no incorrect determining. The allowable error refers to a maximum error that actually exists due to a technical factor.

In this embodiment, the time length may be normalized by dividing the time length by "D/S" (dividing D by S), and a purpose of "D/S" is actually to take a proper unit of a normalized time length. D indicates a maximum allowable error value of the time lengths obtained by the first terminal and the second terminal, and is in a unit of a microsecond. For example, it may be assumed that a value of D is 1000, and S is 5. After the calculation, an allowable difference value between the normalized time lengths of the two terminals is from 0 to S. After the calculation, the interval of incorrect determining still exists. However, a larger value of S leads to a smaller interval of incorrect determining and a lower possibility of incorrect determining. However, S needs to be controlled within a proper range, and a larger value of S leads to a higher calculation amount of a determining process. Generally, it is relatively proper that the value of S is 5, and this embodiment sets no limitation on another value of S. The foregoing normalization method may as well be referred to as a DS method.

In this embodiment, when detecting a preset pairing trigger event, a terminal acquires a pairing hidden value that is of the terminal and that is associated with the pairing trigger event, and implements a pairing process with a peer end by using the pairing hidden value of the terminal. Compared with some approaches, in the present disclosure, pairing can be accurately implemented without using an NFC interface, which reduces costs of terminal pairing.

Embodiment 2

In this embodiment, first, the terminal acquires a public key of a peer end by using a pairing hidden value of the terminal and information from the peer end, where the information from the peer end includes a pairing hidden value of the peer end; then, the terminal generates a shared key of the terminal by using the public key of the peer end and a private key of the terminal; finally, the terminal implements pairing with the peer end by verifying the shared key of the terminal and a shared key of the peer end.

Figure 5:
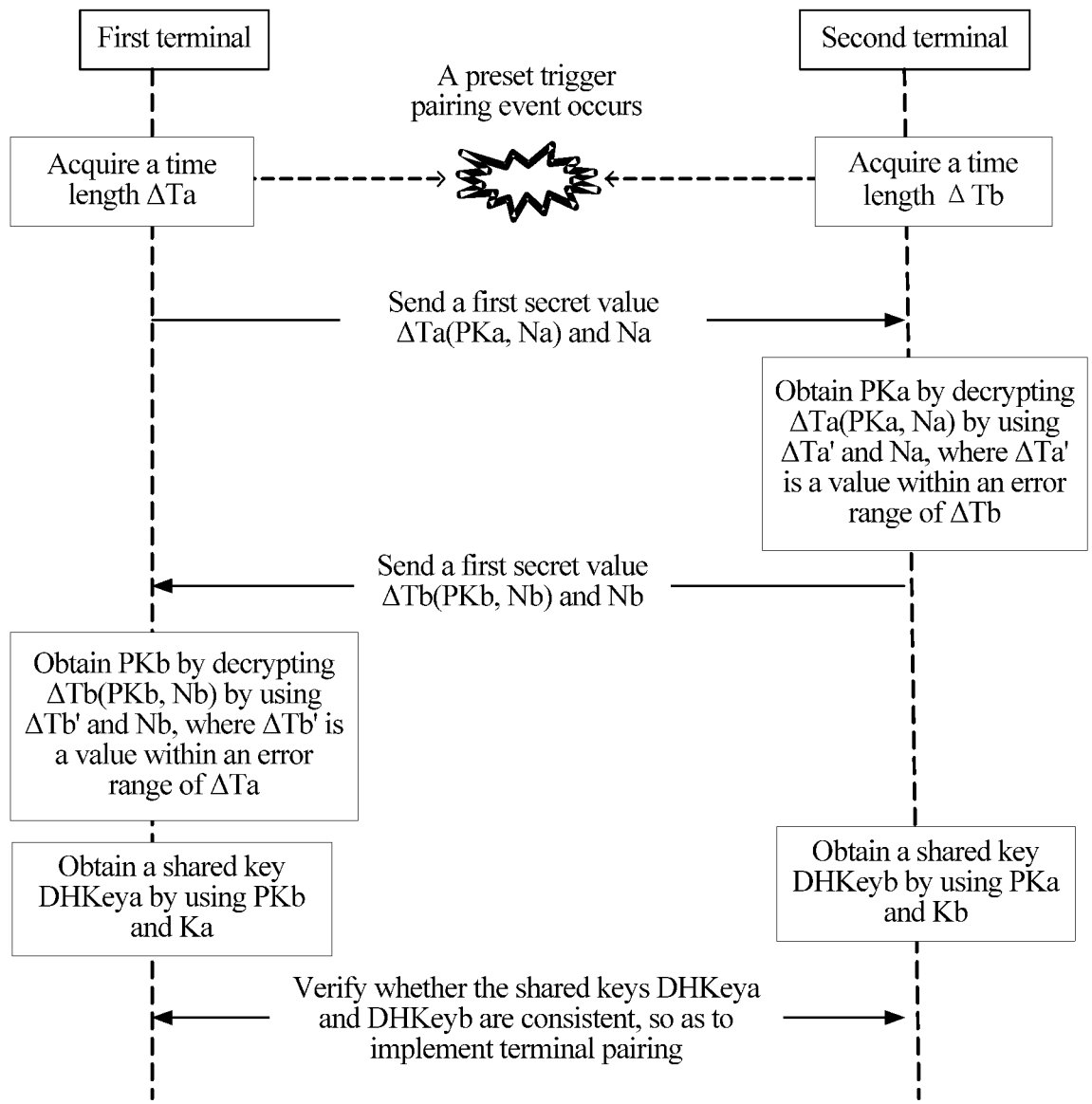
FIG. 5 is an interaction diagram of a terminal pairing method according to an embodiment of the present disclosure.

For a specific implementation manner, refer to FIG. 5. FIG. 5 is an interaction diagram of a terminal pairing method provided in this embodiment. Terminals implementing pairing are respectively a first terminal and a second terminal, and the method includes:

S501: The first terminal and the second terminal acquire pairing hidden values that are of the terminals and that are based on occurrence time of a preset pairing trigger event, where the pairing hidden values may be time lengths.

A method for acquiring the pairing hidden values in this step is described in Embodiment 1, and details are not described herein again.

S502: The first terminal and the second terminal separately receive a first secret value and any random number that are sent by the peer end, where a first secret value of the second terminal that is received by the first terminal may be obtained by the second terminal by encrypting a key exchange algorithm public key (public key for short) of the second terminal and the random number of the second terminal by using a normalized time length of the second terminal. Similarly, a first secret value from the first terminal that is received by the second terminal is obtained by the first terminal by encrypting a key exchange algorithm public key (public key for short) of the first terminal and the random number of the first terminal by using a normalized time length of the first terminal. It can be learned that the first secret value of the first terminal and the first secret value of the second terminal are generally different.

In this embodiment, $\Delta Ta$ may be used to represent a pairing hidden value of the first terminal, $\Delta Tb$ represents a pairing hidden value of the second terminal, and $\Delta Ta$ and $\Delta Tb$ are results normalized by using the DS method described in Embodiment 1, where a value of S is set to 5. Na may be used to represent the random number of the first terminal, Nb represents the random number of the second terminal, PKa represents the public key of the first terminal, and PKb represents the public key of the second terminal. Therefore, the first secret value of the first terminal may be represented by $\Delta Ta(PKa, Na)$, and the first secret value of the second terminal may be represented by $\Delta Tb(PKb, Nb)$.

In an actual application, the first secret value and the random number may not be sent in a same message. Specifically, the first secret value may be first sent, and the random number is sent after the peer end receives the first secret value. It can be understood that this embodiment sets no limitation on a sending sequence of the first secret value and the random number.

The random number in this embodiment may be associated with information such as current time of a terminal generating the random number and a specific counter. However, a value of the random number is generally random.

In an actual application, a Diffie-Hellman (DH) key exchange algorithm may be used in this step. The DH key exchange algorithm may enable two parties that completely have no beforehand information of the other party to establish a key by using an insecure channel, where the key may be used as a symmetric key to encrypt communication content in subsequent communication. Because a man-in-the-middle attack may be performed on a process of DH public key exchange, $\Delta Ta$ and $\Delta Tb$ are used to protect the process of public key exchange in this embodiment. In this way, an attacker can perform the man-in-the-middle attack only if $\Delta Ta$ or $\Delta Tb$ are correctly speculated. However, it is not easy for the attacker to speculate a value of $\Delta Ta$ or $\Delta Tb$. Therefore, it is difficult to implement the man-in-the-middle attack.

The foregoing DH key exchange algorithm may be replaced by another key exchange algorithm; for example, an enhanced DH algorithm (ECDH) algorithm is used, which is not limited in the present disclosure.

S503: The first terminal and the second terminal respectively use their respective pairing hidden values and received random numbers to decrypt the received first secret values, so as to obtain public keys of the peer ends.

Specifically, the received first secret values are decrypted in a trial calculation manner in this embodiment. Theoretically, if the first terminal and the second terminal are two terminals in which the pairing trigger event occurs, $\Delta Ta$ and $\Delta Tb$ of the two terminals are within an allowable error range. Then, a proper value range of $\Delta Ta$ should be greater than or equal to $\Delta Tb-5$ and less than or equal to $\Delta Tb+5$, that is, $\Delta Tb-5 =< \Delta Ta <= \Delta Tb+5$. Therefore, the second terminal in this embodiment may use $\Delta Ta'$ to perform decryption calculation on the received first secret value, so as to obtain a decrypted public key $PKa'$ and random number $Na'$. A value of $\Delta Ta'$ may be an integer value ranging from $\Delta Tb-5$ to $\Delta Tb+5$. If the random number $Na'$ obtained by decryption calculation is the same as the received Na, it proves that the calculated public key $PKa'$ in this case is the public key PKa of the first terminal, and a value of $\Delta Ta'$ in this case is the value of $\Delta Ta$. If the second terminal does not successfully obtain, by decryption, $Na'$ that is equal to Na after performing trial calculation on all $\Delta Ta'$, the process is terminated. The second terminal may make no response, or send a message to the first terminal, so as to feed back a result of a pairing failure to the first terminal.

In this embodiment, a process in which the second device performs trial calculation on $\Delta Ta$ may be represented by using the following pseudo code:

$\Delta Ta'=\Delta Tb-5$
While ($\Delta Ta'<=\Delta Tb+5$) do $(PKa', Na')=\Delta Ta'(\Delta Ta(PKa, Na))$
//obtain PKa' and Na' by decrypting $\Delta Ta(PKa, Na)$ by using $\Delta Ta'$
If ($Na'==Na$)
Return SUCCESS //success
Endif $\Delta Ta'=\Delta Ta'+1$
Endwhile Return FAIL
//failure Similarly, an operation of the first terminal is similar to that of the second terminal, and details are not described herein again.

It is worth noting that a step of decrypting a first secret value may be executed by one terminal first, and if the terminal may obtain a public key of a peer end, the terminal sends a random number or the first secret value to the peer end, so that the peer end further acquires a key. In this way, pairing efficiency may be improved, so that a terminal that is not properly paired relatively rapidly obtains a result of a pairing failure.

S504: The first terminal and the second terminal respectively generate shared keys by using the public keys of the peer ends that are obtained by encryption and their respective private keys.

In this embodiment, the first terminal calculates a DH shared key DHKeya by using a private key Ka corresponding to the public key PKa of the first terminal and the public key PKb of the second terminal that is obtained by decryption, and the second terminal calculates a DH shared key DHKeyb by using a private key Kb corresponding to the public key PKb of the second terminal and the public key PKa of the first terminal. According to a DH algorithm feature, DHKeya and DHKeyb should be equal.

In addition, the shared key may be calculated with reference to Na and Nb, so that a calculated shared key is not changeless in a case in which public keys exchanged by the first terminal and the second terminal are unchanged each time.

In an actual application, if an attacker cannot correctly speculate $\Delta Ta$ and/or $\Delta Tb$ once in S502, an attack does not succeed. Even though the attacker obtains, by off-line calculation, $\Delta Ta$ and $\Delta Tb$ after obtaining Na and Nb in plaintext and then obtains PKa and PKb, it is useless for the attacker. Because the attacker cannot know private keys corresponding to PKa and PKb, a shared key between the first terminal and the second terminal cannot be obtained, and therefore secret data subsequently exchanged between the first terminal and the second terminal cannot be acquired. Pairing accuracy of the two parties is further ensured in a key sharing manner in this embodiment.

S505: The first terminal and the second terminal determine to be paired with the peer end separately by verifying the shared key.

In this embodiment, after obtaining the shared keys by calculation, the first terminal and the second terminal need to verify whether the shared keys of the two parties are consistent. If the shared keys of the two parties are consistent, it proves that terminal pairing succeeds; otherwise, there may be an abnormal case, such as a man-in-the-middle attack.

In an actual application, the first terminal and the second terminal may protect subsequent data exchange by directly using a shared key that is obtained after public key exchange. Generally, a subsequent message includes a message integrity code, where the message integrity code is obtained by encrypting summary information of the message by using the shared key. If the first terminal and the second terminal may complete data exchange, it indicates that the two parties have a same shared key.

In addition, the two terminals may first verify whether the other party has a shared key consistent with that of the terminal. For example, a four-step handshake process in 802.11 specifications may be executed, and a shared key DHKey is considered as a pairwise master key (PMK) defined in the 802.11 specifications. A pairwise transient key (PTK) is generated after a four-step handshake succeeds, and the PTK is used to protect the subsequent data exchange. After the two parties obtain the shared key, one party may send one piece of configuration information to the other party by using the shared key, where the configuration information includes a new key, and the new key is used for a subsequent connection. If both the two parties can successfully acquire the new key, it proves that pairing succeeds. In addition, the two parties may further exchange a contact card under the protection of the shared key or a session key, where the contact card includes a user identity, such as a user name, so that a terminal user further determines that the two parties succeed in pairing. In short, there are many methods for pairing verification by using the shared key, and the present disclosure sets no limitation thereto.

It is worth noting that FIG. 5 is only a specific implementation manner of terminal pairing. For implementing terminal pairing, an execution sequence of steps in FIG. 5 is not unique.

Embodiment 3

Figure 6:
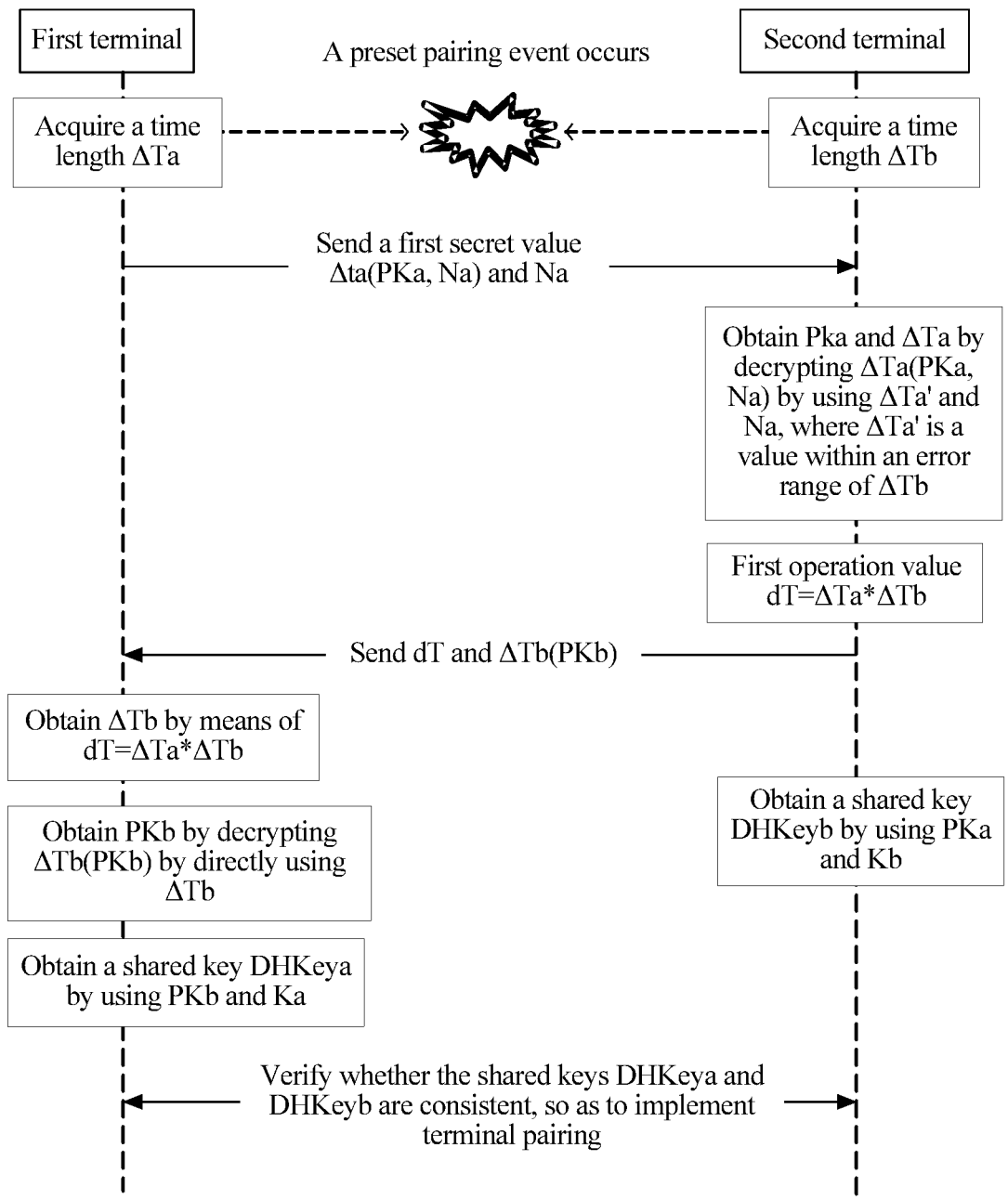
FIG. 6 is an interaction diagram of a terminal pairing method according to an embodiment of the present disclosure.

Referring to FIG. 6, FIG. 6 is an interaction diagram of a terminal pairing method provided in this embodiment. Terminals implementing pairing are respectively a first terminal and a second terminal, and the method includes:

S601: The first terminal and the second terminal acquire pairing hidden values that are of the terminals and that are based on occurrence time of a preset pairing trigger event, where the pairing hidden values may be time lengths.

A method for acquiring the pairing hidden values in this step is described in Embodiment 1, and details are not described herein again.

S602: After acquiring a pairing hidden value and a public key that are of the first terminal, the second terminal obtains a first operation value by means of a preset operation method by using a pairing hidden value of the second terminal and the pairing hidden value of the first terminal.

In an actual application, for a method in which the second terminal acquires the pairing hidden value and the public key that are of the first terminal, reference may be made to Embodiment 2, and details are not described herein again.

The preset operation method in this embodiment may be a reversible operation. An operator may be represented by '*' and may be specifically arithmetic addition, subtraction, multiplication, or the like. Specifically, the first operation value may be represented by dT, where dT=$\Delta Ta*\Delta Tb$, and $\Delta Ta$ and $\Delta Tb$ respectively represent time lengths of the first terminal and the second terminal.

S603: The first terminal uses the pairing hidden value of the first terminal to parse the first operation value and obtain the pairing hidden value of the second terminal.

The following table lists a method in which the first terminal calculates $\Delta Tb$, where the method corresponds to a method in which the second terminal calculates dT (in the table, '*' represents arithmetic multiplication, and xor represents exclusive-OR), which is as follows:

| Calculating dT in a device B | Calculating $\Delta Tb$ in a device A |
|---|---|
| dT = $\Delta Tb - \Delta Ta$ | $\Delta Tb = \Delta Ta + dT$ |
| dT = $\Delta Ta - \Delta Tb$ | $\Delta Tb = \Delta Ta - dT$ |
| dT = $\Delta Ta + \Delta Tb$ | $\Delta Tb = dT - \Delta Ta$ |
| dT = $\Delta Ta * \Delta Tb$ | $\Delta Tb = dT/\Delta Ta$ |
| dT = $\Delta Ta$ xor $\Delta Tb$ | $\Delta Tb = \Delta Ta$ xor dT |

S604: The first terminal obtains a public key of the second terminal by decrypting a first secret value from the second terminal by using the pairing hidden value of the second terminal, where the first secret value of the second terminal may be obtained by encrypting the public key of the second terminal by using the pairing hidden value of the second terminal.

In an actual application, the first secret value from the second terminal that is received by the first terminal may be obtained by encrypting the public key by using the pairing hidden value, or may be obtained by encrypting the public key and a random number by using the pairing hidden value. After obtaining $\Delta Tb$ by calculation according to dT and $\Delta Ta$ of the first terminal, the first terminal may directly use $\Delta Tb$ to decrypt the first secret value from the second terminal to obtain the public key of the second terminal.

S605: The first terminal and the second terminal respectively generate shared keys by using their respective private keys and a public key of a peer end.

S606: The first terminal and the second terminal determine to be paired with the peer end separately by verifying the shared key.

For implementation manners of S605 and S606, reference may be made to description in Embodiment 1, and details are not described herein again. In addition, an execution sequence of steps in this embodiment may not be limited.

Embodiment 4

Figure 7:
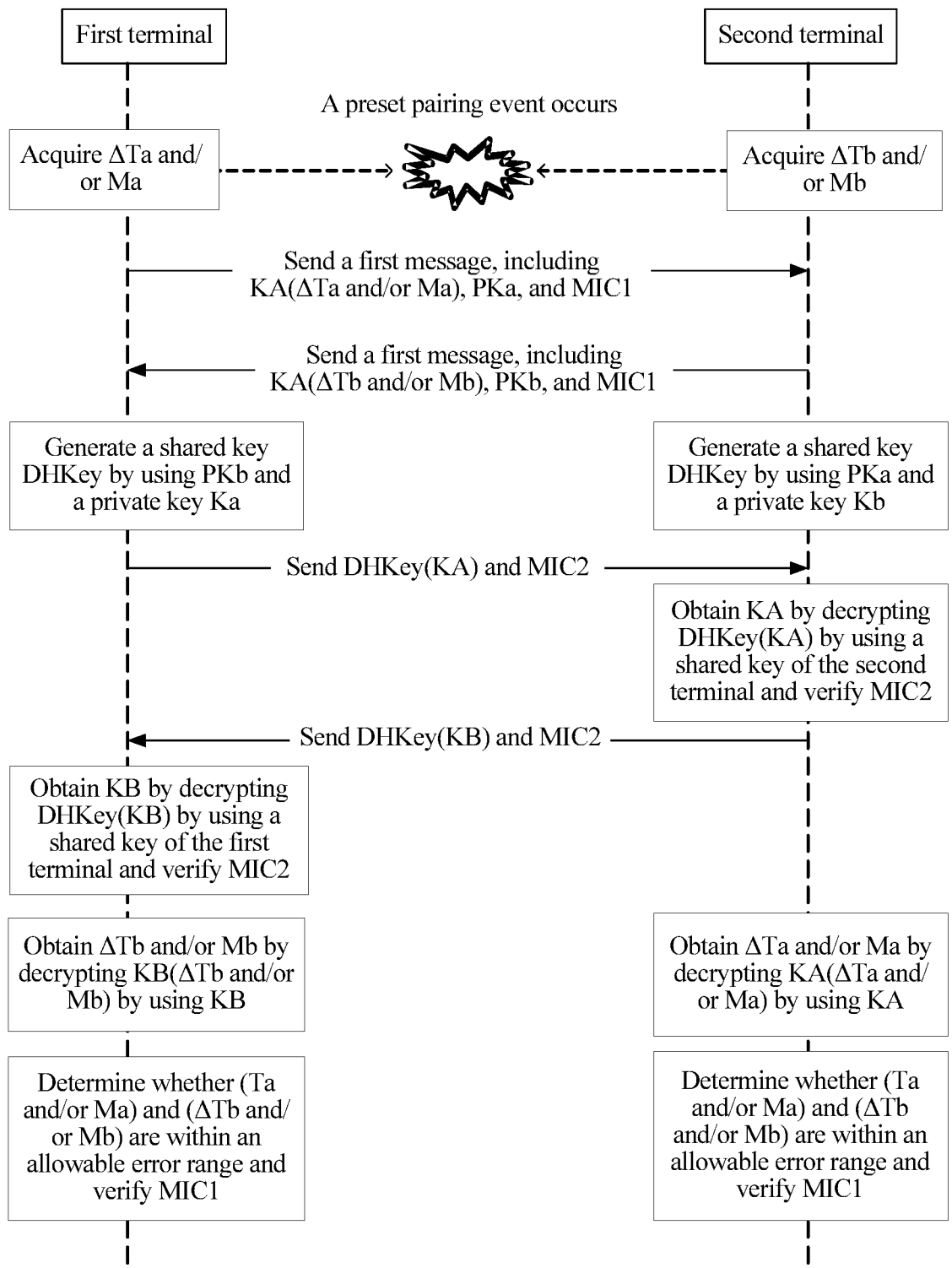
FIG. 7 is an interaction diagram of a terminal pairing method according to an embodiment of the present disclosure.

Referring to FIG. 7, FIG. 7 is an interaction diagram of a terminal pairing method provided in this embodiment. Terminals implementing pairing are respectively a first terminal and a second terminal, and the method includes:

S701: The first terminal and the second terminal acquire pairing hidden values that are of the terminals and that are based on occurrence time of a preset pairing trigger event, where the pairing hidden values may be time lengths and/or motion direction values.

A method for acquiring the pairing hidden values in this step is described in Embodiment 1, and details are not described herein again.

S702: The first terminal and the second terminal separately receive a first message from a peer end, where the first message includes a public key of a DH key exchange algorithm and a second secret value that are of the peer end, and the second secret value includes a value obtained by encrypting a pairing hidden value of the peer end by using a preset key of the peer end.

In an actual application, the first terminal obtains a second secret value SKA (ΔTa and/or Ma) by encrypting ΔTa and/or Ma by using a key SKA of an encryption/decryption algorithm that is preset by the first terminal or randomly generated, where ΔTa represents a time length of the first terminal, and Ma is used to represent a motion direction value of the first terminal. Encrypted information and a public key PKa together form the first message, and the first message is sent to the second terminal. Similarly, the second terminal also sends the first message to the first terminal, and a specific implementation form is similar to that of the first terminal.

In addition, the first message separately sent by the two terminals may further include a first message integrity code MIC1. Specifically, the MIC1 is obtained by a sending party by performing an operation, for example, an encryption operation, on summary information of the first message by using ΔTa and/or Ma. In addition, the SKA may further engage in MIC1 generation. The SKA may be a symmetric key, or may be an asymmetric key. If the SKA is an asymmetric key, the SKA herein actually refers to a private key part used for encryption and may be denoted as SKAe. Therefore, the second secret value is actually SKAe (ΔTa and/or Ma).

S703: The first terminal and the second terminal respectively generate shared keys by using their own private keys and the public key of the peer end.

In this embodiment, after obtaining the public key of the peer end, the first terminal and the second terminal may generate shared keys DHKey with reference to their own private keys and the public key of the peer end (for example, the second terminal uses a private key Kb corresponding to PKb of the second terminal and a public key PKa of the first terminal). For a specific implementation manner, reference may be made to Embodiment 2. Certainly, persons skilled in the art should understand that a shared key may be obtained by using another key exchange algorithm in this embodiment, which is not listed one by one herein.

S704: The first terminal and the second terminal separately receive a second message from the peer end, where the second message includes a third secret value, and the third secret value includes a value obtained by the peer end by encrypting an encryption/decryption key of the peer end by using a shared key of the peer end.

In this embodiment, the first terminal obtains a third secret value DHKey (SKA) by encrypting the key SKA of the first terminal by using a generated shared key DHKey, generates the second message, and sends the second message to the second terminal. In addition, the first terminal may use a first derivative key of the shared key DHKey to encrypt the SKA. Similarly, an implementation process of the second terminal is the same as that of the first terminal, and a third secret value generated by the second terminal may be a DHKey (SKB). If the SKA is an asymmetric key, a public key part of the SKA is encrypted and sent, where the public key part of the SKA may be denoted as SKAd. Therefore, the third secret value is actually a DHKey (SKBd).

In addition, the second message sent by the two terminals may further include a second message integrity code MIC2. The MIC2 is obtained by a sending party by performing an operation, for example, an encryption operation, on summary information of the second message by using a generated DHKey. Alternatively, the MIC2 is obtained by the sending party by performing an operation on the summary information of the second message by using a second derivative key of the generated DHKey.

S705: The first terminal and the second terminal separately decrypt, by using their own shared keys, the third secret value to obtain a key of the peer end, and correspondingly decrypt, by using the key of the peer end, the second secret value to obtain the pairing hidden value of the peer end.

In an actual application, after receiving the second message, the first terminal decrypts, by using the generated shared key DHKey, a third secret value DHKey (SKB) in the second message to obtain a preset key SKB of the second terminal. If the first terminal can decrypt the third secret value from the second terminal, it proves that the second terminal and the first terminal have a same shared key DHKey. The first terminal further decrypts, by using the obtained key SKB of the second terminal, the second secret value to obtain a pairing hidden value ΔTb and/or Mb of the second terminal. Similarly, an implementation process of the second terminal is the same as that of the first terminal.

It is worth noting that in this embodiment, to improve efficiency of terminal pairing, S705 may be completed on one terminal and then S704 is executed after it is proved that the terminal and the peer end have a same shared key, as shown in FIG. 5.

In addition, the first terminal may use the foregoing manner to prove that the second terminal and the first terminal have the same shared key DHKey; moreover, if the second message further includes the second message integrity code MIC2, the second message integrity code MIC2 further needs to be verified in this embodiment, so as to prove that the second terminal and the first terminal have the same DHKey. Because the second message integrity code MIC2 is obtained by the peer end by encrypting the summary information of the second message by using the shared key of the peer end, the shared key of the terminal may be used to verify the second message integrity code MIC2 in this embodiment. If verification is passed, it proves that the peer end and the terminal have the same DHKey.

S706: The first terminal and the second terminal determine to be paired with the peer end separately according to their own pairing hidden values and the pairing hidden value of the peer end.

In this embodiment, after separately obtaining the pairing hidden value of the peer end, the two terminals compare the pairing hidden value of the peer end with their own pairing hidden values. If a difference value between time lengths of the two terminals is within an allowable error range, it proves that a pairing trigger event occurs in the peer end and the terminal; or if motion direction values of the two terminals within the error range indicate that motion directions of the two terminals are opposite, it proves that the pairing trigger event occurs in the peer end and the terminal; or if the foregoing two cases are simultaneously satisfied, it proves that the pairing trigger event occurs in the peer end and the terminal. If the terminal finds, according to the foregoing comparison, that the peer end is not a terminal with which the pairing trigger event occurs, a processing process may be terminated, that is, no message is sent to the peer end any longer.

In addition, if the first message further includes the first message integrity code MIC1, the first message integrity code (MIC1) further needs to be verified in this embodiment. The MIC1 in the received first message is obtained by the peer end by engaging in and combining a summary information operation of the first message by using the pairing hidden value of the peer end. Specifically, the MIC1 may be obtained by encrypting summary information by using the pairing hidden value as a key. However, when the first message is received, the pairing hidden value of the peer end cannot be immediately learned. Therefore, the MIC1 may be verified after the pairing hidden value of the peer end is obtained in S705 in this embodiment. When the MIC1 passes verification, and pairing hidden values of the two terminals are also within the allowable error range, it can be proved that the two terminals implement pairing. If the MIC1 does not pass verification, it indicates that there may be an abnormal case, such as a man-in-the-middle attack. The terminal may terminate the processing process and does not exchange any message with the peer end any longer.

It should be noted that the time lengths in this embodiment, for example, ΔTa and ΔTb, do not need to be normalized, because the time lengths are secretly transmitted and are directly used for comparison, and a trial calculation process mentioned in Embodiment 2 and Embodiment 3 is not required.

Embodiment 5

Figure 8:
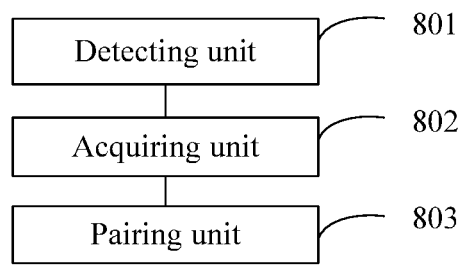
FIG. 8 is a schematic structural diagram of a pairing terminal according to an embodiment of the present disclosure.

Referring to FIG. 8, FIG. 8 is a schematic structural diagram of a pairing terminal provided in this embodiment, where the terminal includes a detecting unit 801, an acquiring unit 802, and a pairing unit 803.

The detecting unit 801 is configured to detect a preset pairing trigger event.

The acquiring unit 802 is configured to: when the detecting unit detects the preset pairing trigger event, acquire a pairing hidden value that is of the terminal and that is associated with the pairing trigger event.

The pairing unit 803 is configured to implement pairing with the peer end by using the pairing hidden value of the terminal.

The acquiring unit 802 includes a first acquiring subunit configured to, when the detecting unit detects the preset pairing trigger event, acquire a time length of the terminal that is relative to occurrence time of the event and that is obtained based on a common reference time point with the peer end; and/or, a second acquiring subunit configured to acquire a motion direction value of the terminal when the detecting unit detects the preset pairing trigger event.

In an actual application, the first acquiring subunit includes: a third acquiring subunit configured to, when the detecting unit detects the preset pairing trigger event, acquire the occurrence time of the preset pairing trigger event as a first time point of the terminal; a fourth acquiring subunit configured to acquire, according to any message exchanged with the peer end, a second time point that is of the terminal and that is based on the message with the peer end; and a fifth acquiring subunit configured to acquire the time length of the terminal, where the time length of the terminal is a time interval between the first time point of the terminal and the second time point of the terminal.

The first acquiring subunit further includes a first sending subunit configured to randomly delay time r after the preset pairing trigger event is detected, and send a discovery request message to the peer end by using a wireless interface; and a first receiving subunit configured to receive a discovery response message from the peer end, where the discovery response message is sent after time R is delayed after the peer end receives the discovery request message, and R is greater than r.

In addition, the fourth acquiring subunit may be specifically a unit that acquires, according to any message exchanged with the peer end on a preset channel, the second time point that is of the terminal and that is based on the message with the peer end.

In addition, the terminal may further include a correcting subunit configured to correct the time length of the terminal by using a method of incorrect determining by an allowable error.

Figure 9:
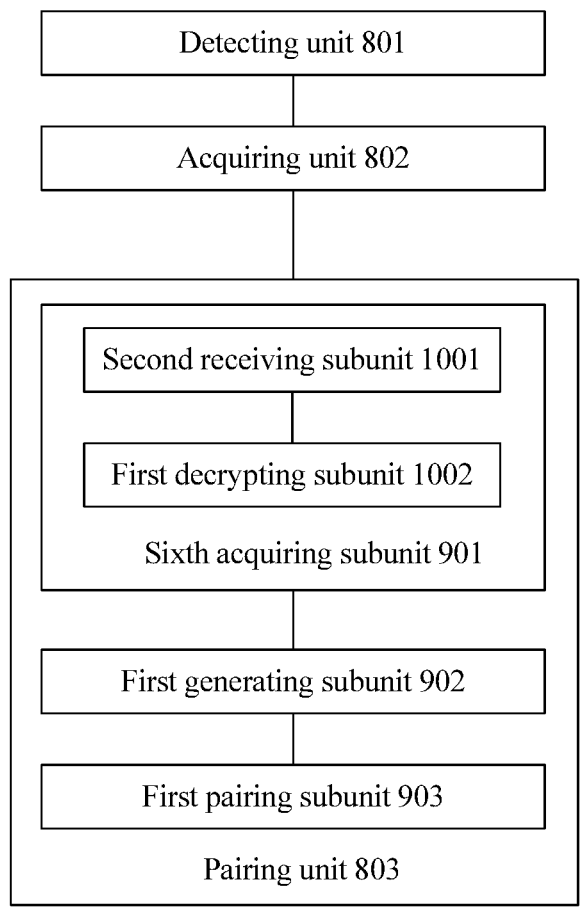
FIG. 9 is a schematic structural diagram of a pairing terminal in an implementation manner according to an embodiment of the present disclosure.
Figure 10:
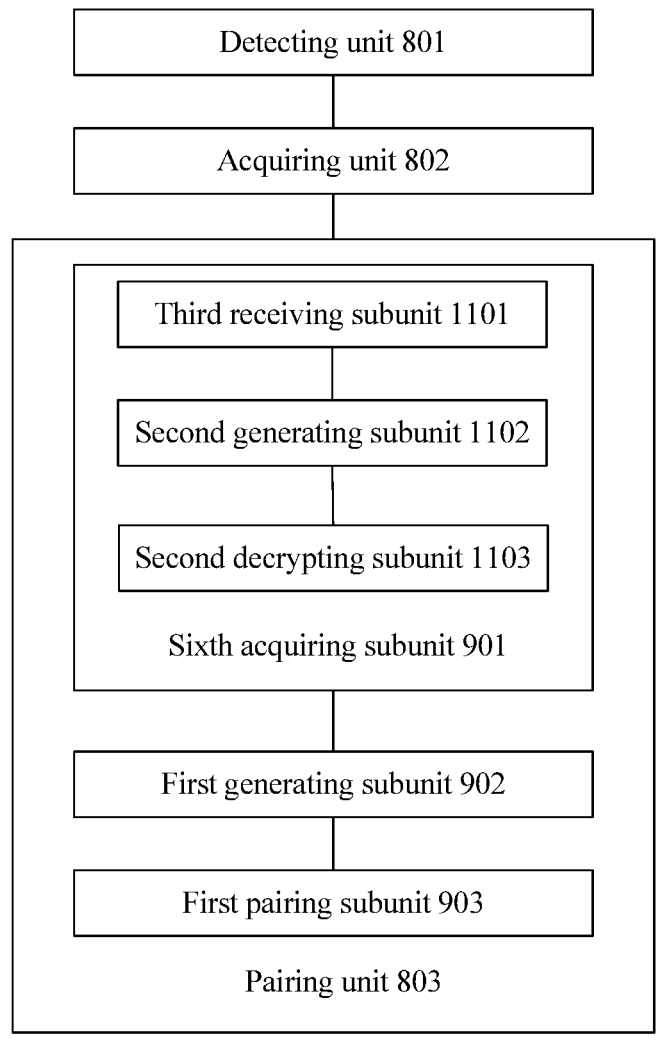
FIG. 10 is a schematic structural diagram of a pairing terminal in an implementation manner according to an embodiment of the present disclosure.

Referring to FIG. 9 and FIG. 10, FIG. 9 and FIG. 10 are separately a schematic structural diagram of a pairing terminal in an implementation manner according to this embodiment, where the terminal includes a detecting unit 801, an acquiring unit 802, and a pairing unit 803, where the pairing unit 803 includes a sixth acquiring subunit 901 configured to acquire a public key of the peer end by using the pairing hidden value of the terminal and information from the peer end, where the information from the peer end includes a pairing hidden value of the peer end; a first generating subunit 902 configured to generate a shared key of the terminal by using the public key of the peer end and a private key of the terminal; and a first pairing subunit 903 configured to implement pairing with the peer end by verifying the shared key of the terminal and a shared key of the peer end.

The terminal further includes a sending unit, where the sending unit is configured to send the pairing hidden value of the terminal to the peer end, so that the peer end implements pairing with the terminal.

The sixth acquiring subunit 901 may include a second receiving subunit 1001 configured to receive a first secret value and any random number that are sent by the peer end, where the first secret value is obtained by encrypting the public key and the random number that are of the peer end by using the pairing hidden value of the peer end; and a first decrypting subunit 1002 configured to decrypt, by using the pairing hidden value of the terminal and the random number of the peer end, the first secret value to obtain the public key of the peer end.

Alternatively, the sixth acquiring subunit 901 may include a third receiving subunit 1101 configured to receive a first secret value and a first operation value that are sent by the peer end, where the first secret value includes a value obtained by encrypting the public key of the peer end by using the pairing hidden value of the peer end, and the first operation value includes a value obtained by using the pairing hidden value of the terminal and the pairing hidden value of the peer end by means of a preset budget method; a second generating subunit 1102 configured to obtain the pairing hidden value of the peer end by using the first operation value from the peer end and the pairing hidden value of the terminal; and a second decrypting subunit 1103 configured to decrypt, by using the pairing hidden value of the peer end, the first secret value from the peer end to obtain the public key of the peer end.

Figure 11:
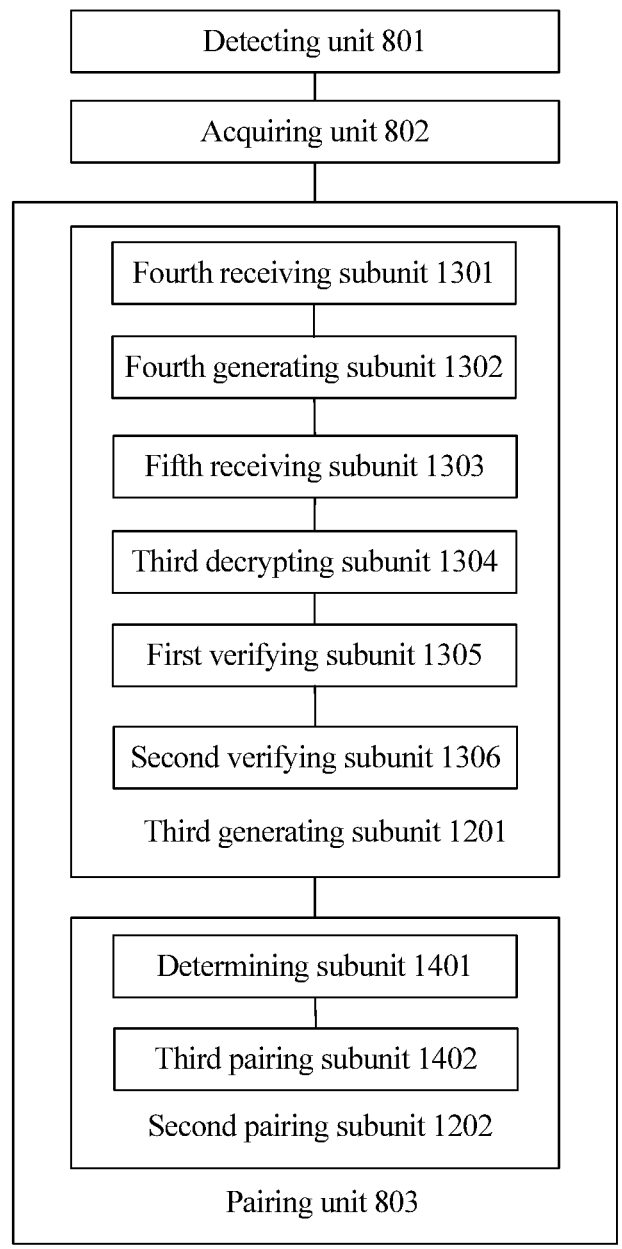
FIG. 11 is a schematic structural diagram of a pairing terminal in another implementation manner according to an embodiment of the present disclosure.

Referring to FIG. 11, FIG. 11 is a schematic structural diagram of a pairing terminal in another implementation manner according to this embodiment, where the terminal includes a detecting unit 801, an acquiring unit 802, and a pairing unit 803, where the pairing unit 803 includes a third generating subunit 1201 configured to obtain a pairing hidden value of the peer end by using information from the peer end and information of the terminal, where the information from the peer end includes a public key and the pairing hidden value that are of the peer end, and the information of the terminal includes a private key of the terminal; and a second pairing subunit 1202 configured to implement pairing with the peer end by comparing the pairing hidden value of the terminal and the pairing hidden value of the peer end.

The third generating subunit 1201 includes a fourth receiving subunit 1301 configured to receive a first message from the peer end, where the first message from the peer end includes the public key and a second secret value that are of the peer end, and the second secret value of the peer end includes a value obtained by encrypting the pairing hidden value of the peer end by using a preset key of the peer end; a fourth generating subunit 1302 configured to generate a shared key of the terminal by using the private key of the terminal and the public key of the peer end; a fifth receiving subunit 1303 configured to receive a second message from the peer end, where the second message from the peer end includes a third secret value of the peer end, and the third secret value of the peer end includes a value obtained by encrypting the preset key of the peer end by using a shared key of the peer end; and a third decrypting subunit 1304 configured to decrypt, by using the shared key of the terminal, the third secret value of the peer end to obtain the preset key of the peer end, and decrypt, by using the preset key of the peer end, the second secret value of the peer end to obtain the pairing hidden value of the peer end.

In addition, the first message from the peer end further includes a first message integrity code of the peer end, where the first message integrity code of the peer end includes a value obtained by the peer end by encrypting summary information of the first message from the peer end by using the pairing hidden value of the peer end; and the third generating subunit 1201 further includes a first verifying subunit 1305, where the first verifying subunit 1305 is configured to verify the first message integrity code of the peer end by using the pairing hidden value of the peer end.

In addition, the second pairing subunit 1202 includes a determining subunit 1401 configured to determine whether a difference between the pairing hidden value of the terminal and the pairing hidden value of the peer end is within a preset allowable error range; and a third pairing subunit 1402 configured to implement pairing with the peer end when the difference is within the preset allowable error range and the first message integrity code of the peer end passes verification.

In an actual application, the second message from the peer end further includes a second message integrity code of the peer end, where the second message integrity code of the peer end includes a value obtained by the peer end by encrypting summary information of the second message from the peer end by using the shared key of the peer end; and the third generating subunit 1201 further includes a second verifying subunit 1306, where the second verifying subunit 1306 is configured to verify the second message integrity code of the peer end by using the shared key of the terminal.

In this embodiment, when detecting a preset pairing trigger event, a terminal acquires a pairing hidden value that is of the terminal and that is associated with the preset pairing trigger event, and implements pairing with a peer end by using the pairing hidden value of the terminal. Compared with some approaches, in this embodiment, pairing can be accurately implemented without using an NFC interface, which reduces costs of terminal pairing.

Further, this embodiment of the present disclosure further separately provides hardware constitution of a pairing terminal. The pairing terminal may include at least one processor (for example, a CPU), at least one wireless network interface, an apparatus for detecting a pairing trigger event, a memory, and at least one bus, which is used to implement signal transmission among these apparatuses. The processor is configured to execute an executable module stored in the memory, for example, a computer program. The memory may include a high-speed random-access memory (RAM) and may further include a non-volatile memory, for example, at least one disk memory.

Figure 12:
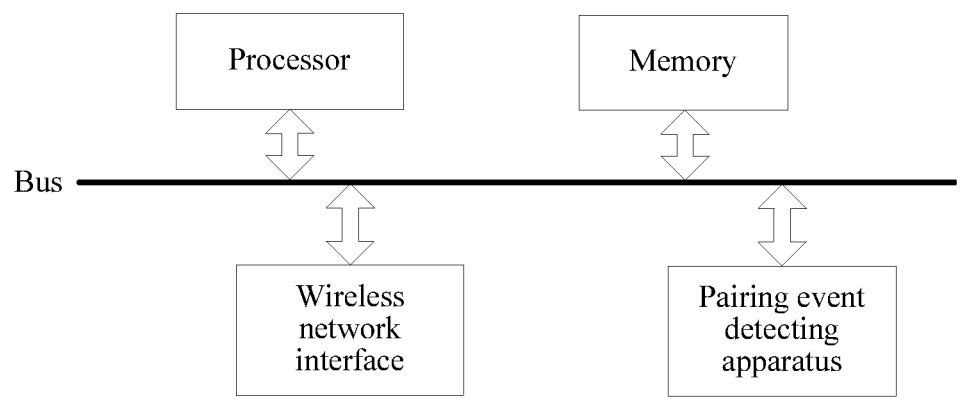
FIG. 12 is a schematic diagram of composition of a pairing terminal according to an embodiment of the present disclosure.

Referring to FIG. 12, in some implementation manners, the memory stores a program instruction, where the program instruction may be executed by the processor, and the program instruction may include an acquiring unit and a pairing unit. For specific implementation of each unit, reference may be made to a corresponding unit disclosed in FIG. 8 to FIG. 11, and details are not described herein again.

It can be learned, according to the foregoing descriptions of the implementation manners, that persons skilled in the art may clearly understand that some or all steps of the methods in the embodiments may be implemented by software in addition to a necessary universal hardware platform. Based on such an understanding, the technical solutions of the present disclosure essentially may be implemented in a form of a software product. The software product may be stored in a storage medium, such as a read-only memory (ROM)/read-access memory (RAM), a magnetic disk, or an optical disc, and includes several instructions for instructing a computer device (which may be a personal computer, a server, or a network device such as media gateway) to perform the methods described in the embodiments or some parts of the embodiments of the present disclosure.

It should be noted that the embodiments in this specification are all described in a progressive manner, for same or similar parts in the embodiments, reference may be made to these embodiments, and each embodiment focuses on a difference from other embodiments. Especially, device and system embodiments are basically similar to a method embodiment, and therefore are described briefly; for related parts, reference may be made to partial descriptions in the method embodiment. The described device and system embodiments are merely exemplary. The units described as separate parts may or may not be physically separate, and parts displayed as units may or may not be physical units, may be located in one position, or may be distributed on a plurality of network units. Some or all of the modules may be selected according to actual needs to achieve the objectives of the solutions of the embodiments. Persons of ordinary skill in the art may understand and implement the embodiments of the present disclosure without creative efforts.

In short, the foregoing descriptions are merely exemplary embodiments of the present disclosure, but are not intended to limit the protection scope of the present disclosure. Any modification, equivalent replacement, or improvement made without departing from the spirit and principle of the present disclosure shall fall within the protection scope of the present disclosure.

The invention claimed is:

1. A method for terminal pairing, the method comprising:
sensing, by a first terminal, whether a touch event occurs with a second terminal;
generating, by the first terminal, a first terminal pairing hidden value when the touch event occurs with the second terminal, the first terminal pairing hidden value including a first occurrence time of the touch event and a first motion direction value of the first terminal relating to the touch event; acquiring, by the first terminal, a second terminal pairing hidden value of the second terminal, the second terminal pairing hidden value including a second occurrence time of the touch event and a second motion direction value of the second terminal relating to the touch event; comparing, by the first terminal, the first and the second terminal pairing hidden values, wherein comparing the first and second terminal pairing hidden values comprises comparing the first motion direction value with the second motion direction value; determining, by the first terminal, whether to pair with the second terminal based on the comparison; initiating, by the first terminal, a pairing with the second terminal based on the determination; and delaying sending, by the first terminal, a discovery request message to the second terminal.

2. The method of claim 1, further comprising receiving, by the first terminal, a discovery response message from the second terminal after a time interval.

3. The method of claim 1, wherein initiating the pairing comprises: acquiring, by the first terminal, a public key of the second terminal with the second terminal pairing hidden value; generating, by the first terminal, a terminal shared key based on the public key and a private key; and verifying the terminal shared key with the terminal shared key of the second terminal.

4. The method of claim 1, wherein initiating the pairing further comprises: receiving, by the first terminal, a first message from the second terminal that includes a public key and a first value obtained by encrypting a second pairing hidden value using a preset key of the second terminal; generating, by the first terminal, a terminal shared key based on a private key and the public key; receiving, by the first terminal from the second terminal, a second message comprising a third secret value that includes a second value obtained by encrypting the preset key using a shared key of the second terminal; decrypting, by the first terminal using the terminal shared key, the third secret value to obtain the preset key of the second terminal; and decrypting, using the preset key, the second value of the second terminal to obtain the second terminal pairing hidden value.

5. A first terminal, comprising:
a sensor configured to sense whether a touch event occurs with a second terminal;
a processor coupled to the sensor and configured to: generate a first terminal pairing hidden value when the touch event occurs with the second terminal, the first terminal pairing hidden value including a first motion direction value of the first terminal relating to the touch event; acquire a second terminal pairing hidden value of the second terminal, the second terminal pairing hidden value including a second motion direction value of the second terminal relating to the touch event, the first and the second terminal pairing hidden values each associated with the touch event; compare the first and the second terminal pairing hidden values, wherein comparing the first and second terminal pairing hidden values comprises comparing the first motion direction value with the second motion direction value; determine, by the first terminal, whether to pair with the second terminal based on the comparison; and initiate a pairing with the second terminal based on the determination; and
a transmitter configured to delay sending a discovery request message to the second terminal.

6. The first terminal of claim 5, further comprising a receiver configured to receive a discovery response message from the second terminal after a time R after the transmitter sends the discovery request message.

7. The first terminal of claim 5, wherein the processor is further configured to: acquire a public key of the second terminal based on the second terminal pairing hidden value; generate a terminal shared key of the first terminal based on the public key and a terminal private key of the first terminal; and verify the terminal shared key and the terminal shared key for pairing with the second terminal.

8. The first terminal of claim 5, further comprising a receiver configured to receive a first message from the second terminal, wherein the first message comprises a second terminal public key and a second secret value of the second terminal, the second secret value comprises a value obtained by encrypting the second terminal pairing hidden value using a second terminal preset key of the second terminal, and the processor is further configured to generate a terminal shared key of the first terminal using a terminal private key and the second terminal public key.

9. The first terminal of claim 8, wherein the receiver is further configured to receive a second message from the second terminal, and the second message comprises a third secret value obtained by encrypting the second terminal preset key using a second terminal shared key.

10. The first terminal of claim 9, wherein the processor is further configured to: decrypt the third secret value with the second terminal shared key to obtain the second terminal preset key; and decrypt the second secret value with the second terminal preset key to obtain the second terminal pairing hidden value.

* * * * *